US005185916A

United States Patent [19]

Maeno et al.

[11] Patent Number: 5,185,916

[45] Date of Patent: * Feb. 16, 1993

[54] METHOD FOR PRODUCING CYLINDRICAL BUSHING WITH HYDRAULIC DAMPING

[75] Inventors: Takashi Maeno; Kyouichi Fujinami; Hiroaki Kawahara; Tetsuo Asano, all of Inazawa, Japan

[73] Assignee: Toyoda Gosei Co., Ltd., Nishikasugai-Gun, Japan

[ * ] Notice: The portion of the term of this patent subsequent to Apr. 2, 2008 has been disclaimed.

[21] Appl. No.: 732,416

[22] Filed: Jul. 18, 1991

[30] Foreign Application Priority Data

Jul. 27, 1990 [JP] Japan .................................. 2-200951
Jan. 30, 1991 [JP] Japan .................................. 3-29434

[51] Int. Cl.[5] .............................................. B23P 19/02

[52] U.S. Cl. ........................................ 29/525; 29/451; 29/897.2

[58] Field of Search ................. 29/446, 451, 458, 525, 29/527.1, 897.2, 898.02, 898.054, 898.059, 898.09, 898.12, 898.15, 522.1; 248/562, 636

[56] References Cited

U.S. PATENT DOCUMENTS 4,167,141 9/1979 Haywood ......................... 29/525 X
4,998,345 3/1991 Funahashi et al. ............... 29/436 X

*Primary Examiner*—Joseph M. Gorski
*Assistant Examiner*—S. Thomas Hughes
*Attorney, Agent, or Firm*—Cushman, Darby & Cushman

[57] ABSTRACT

A method for producing a cylindrical bushing with hydraulic damping includes the steps of preparing an internal ring having an elliptical cross-section including a major axis and a minor axis, disposing within the internal ring a vibration-damping rubber block through which an inner cylinder coaxially penetrates and which has wall portions for defining a liquid chamber, so that the wall portions extend along the minor axis of the internal ring; deforming the internal ring so as to have a circular cross-section; and press-fitting the deformed internal ring into an outer cylinder.

4 Claims, 4 Drawing Sheets

II
32
51
5
52
1
2
A
31
6
31
3
4
8
B
2
7
32
II 52
6
1
A
5
52
3
y
x
2
B
4
8
7

IV
32
2
21
31
31
3
4
2
2
32
IV 32
31
3
4
2

VI
32
51
5
52
1
2
A
31
31
3
6
4
9
7
5
B
22
2
VI 52
1
A
5
6
3
2
52
4
9
22
B
7

32
31
21
4
2
31
22
41
7

31
21
32
3
3
4
2
7
22

METHOD FOR PRODUCING CYLINDRICAL BUSHING WITH HYDRAULIC DAMPING

BACKGROUND OF THE INVENTION

1. Field of the Invention

The present invention relates to a method for producing a cylindrical bushing with hydraulic damping and, more particularly, to a method for efficiently producing a cylindrical bushing having excellent durability.

2. Description of the Prior Art

A cylindrical bushing with hydraulic damping has an outer cylinder, an inner cylinder disposed within the outer cylinder, and a vibration-damping rubber block interposed between the outer cylinder and the inner cylinder. Such a cylindrical bushing achieves an effective vibration-damping operation with a simple construction, frequently used in an engine mount for a motor vehicle. Recently, there has been proposed a new type of cylindrical bushing of which the rubber block contains therewith liquid chambers, each enclosing a damping liquid. With this bushing, vibrations, particularly those of large amplitudes are effectively damped by the operation of the damping liquid.

The cylindrical bushing having the liquid chambers has been produced by forming a vibration-damping rubber block integrally with a cylindrical internal ring, reducing the diameter of the internal ring in order to cancel the tensile stress which has been generated within the rubber block during the formation thereof, and press-fitting the internal ring into the outer cylinder.

With this conventional producing method, wall portions of the rubber block, which define the liquid chamber are also compressed in the reducing step. When a static load of an engine of a motor vehicle is applied to the inner cylinder, it displaces with respect to the outer cylinder. This causes the compressed wall portions to be further compressed. Accordingly, the durability of the wall portions of the rubber block decreases.

The cylindrical bushing is required to provide a secure liquid-tight seal between the outer cylinder and the internal ring. To this end, a rubber seal layer conventionally has been formed therebetween. However, upon reducing of the internal ring, this rubber seal layer is compressed and wrinkles are likely to be formed therein. This causes the decrease in sealing properties of the rubber seal layer.

In order to overcome the above-described disadvantage, conventionally, the rubber seal layer has been formed along the inner periphery of the outer cylinder, and then the internal ring of which the diameter is reduced has been press-fitted into the outer cylinder. This method is unfavorable because of low production efficiency.

SUMMARY OF THE INVENTION

It is an object of the present invention to provide an improved method for producing a cylindrical bushing with hydraulic damping, which maintains the durability of a vibration-damping rubber block, and which forms a secure seal in the cylindrical bushing by a shortened producing process.

The method for producing a cylindrical bushing with hydraulic damping of the present invention includes the steps of: (1) preparing an internal ring having an elliptical cross-section; (2) disposing a vibration-damping rubber block through which an inner cylinder penetrates, and which has wall portions defining a liquid chamber, within the internal ring in close contact therewith so that the wall portions extend along a minor axis of the internal ring; (3) deforming the internal ring so as to have a circular cross-section; and (4) and press-fitting the deformed internal ring into an outer cylinder.

More specifically, the method of the present invention is intended to produce the cylindrical bushing which has an outer cylinder, a cylindrical internal ring press-fitted into the outer cylinder, a vibration-damping rubber block disposed within the external ring so that a main portion thereof horizontally extends and peripheral surfaces of the main portion are joined to an inner periphery of the internal ring, and an inner cylinder coaxially embedded in the rubber block so as to penetrate it, the rubber block having wall portions which extends radially upwardly from both ends of the main portion thereof, each surrounding each of both ends of the inner cylinder, a peripheral surface of each wall portion being joined to an inner periphery of the internal ring, the wall portions defining a main liquid chamber when the internal ring is press-fitted into the outer cylinder, an axially central portion of the internal ring being inwardly caved, a throttling member having a throttle passageway being disposed within the inwardly caved central portion of the internal ring, a thin diaphragm being disposed between a lower surface of the rubber block and the outer cylinder to define an auxiliary liquid chamber, and the auxiliary liquid chamber communicating with the main liquid chamber by way of the throttle passageway.

The method in accordance with the present invention, more specifically includes the steps of; (1) preparing the internal ring having an elliptical cross-section; (2) disposing the main portion of the vibration-damping rubber block through which the inner cylinder penetrates, along the major axis of the internal ring while disposing the wall portions along the minor axis of the internal ring; (3) deforming the internal ring so as to have a circular cross-section; (4) and press-fitting the deformed internal ring into the outer cylinder with the throttling member interposed between the caved central portion of the internal ring and the outer cylinder and the thin diaphragm disposed between the rubber block and the outer cylinder.

In accordance with the method of the present invention, by deforming the internal ring so as to have a circular cross-section, the main portion of the vibration-damping rubber block which has been disposed along the major axis of the undeformed internal ring is compressed so that the tensile stress within the main portion of the vibration-damping rubber block is converted into compressive stress. On the other hand, the wall portions which have extended along the minor axis of the undeformed internal ring are pulled outwardly due to the deformation of the internal ring, thereby generating tensile stress therewithin.

When a vibrating body is connected to the inner cylinder of the cylindrical bushing produced by the method of the present invention, the vibration-damping rubber block is deformed due to the static load applied by the vibrating body, thereby causing the inner cylinder to displace radially outwardly. Due to the displacement of the inner cylinder, the wall portions are compressed, thereby cancelling the tensile stress which has been generated therewithin. Accordingly, even when the inner cylinder displaces greatly, the wall portions are prevented from being excessively compressed, and excessively large tensile stress is limited in the wall portions, whereby durability of the wall portions of the vibration damping rubber block, is maintained.

Furthermore, wrinkles are prevented from being formed in the seal rubber layer located along the outer periphery of the internal ring because the entire length of the internal ring does not change during the deforming step thereof.

In addition, the seal rubber layer can be formed along the outer periphery of the internal ring integrally with the vibration-damping rubber block whereby the production efficiency is improved.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
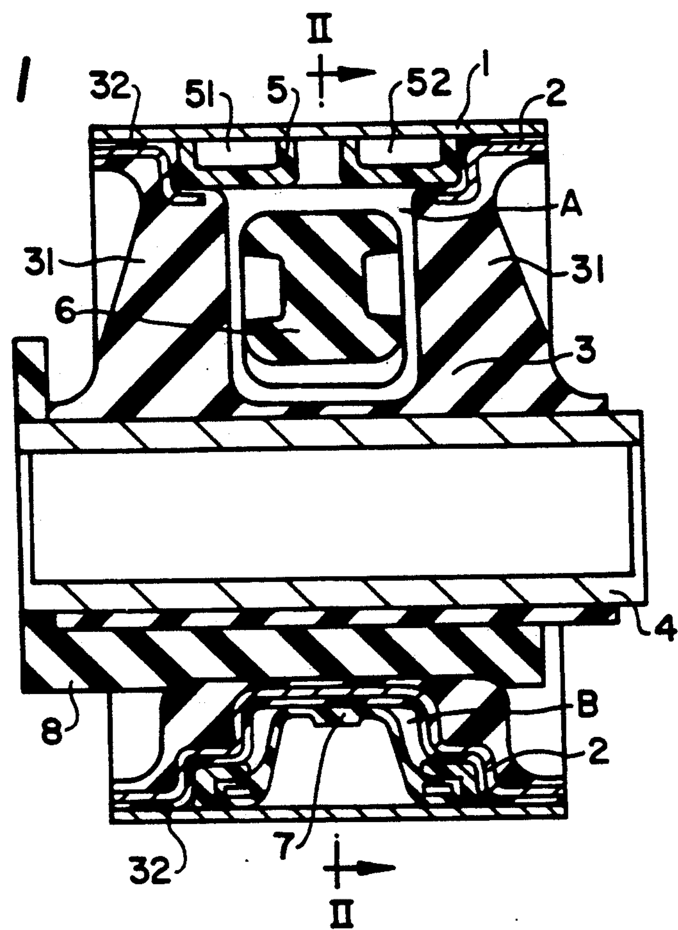
FIG. 1 is a longitudinal sectional view of a cylindrical bushing with hydraulic damping, which is produced by a first embodiment of a method in accordance with the present invention.
Figure 2:
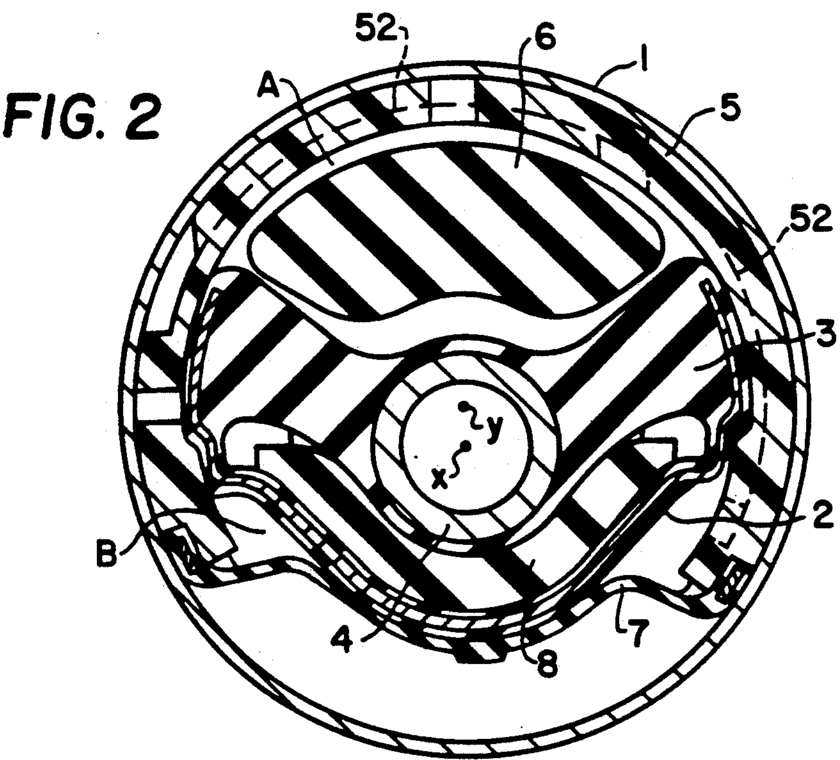
FIG. 2 is a cross-sectional view taken along the line II—II of FIG. 1.

FIGS. 1 and 2 illustrate a cylindrical bushing with hydraulic damping, which is produced by a first embodiment of a method in accordance with the present invention;

Into an outer cylinder 1 having a circular cross-section, an internal ring 2 having a nearly cylindrical configuration is press-fitted. Within the internal ring 2, a vibration-damping rubber block 3 horizontally extends. A main portion of the rubber block 3 is joined to the inner periphery of the internal ring 2 in its opposed outer peripheral surfaces. An inner cylinder 4 is embedded, coaxing with the internal ring, in the rubber block 3 so as to penetrate it.

Figure 3:
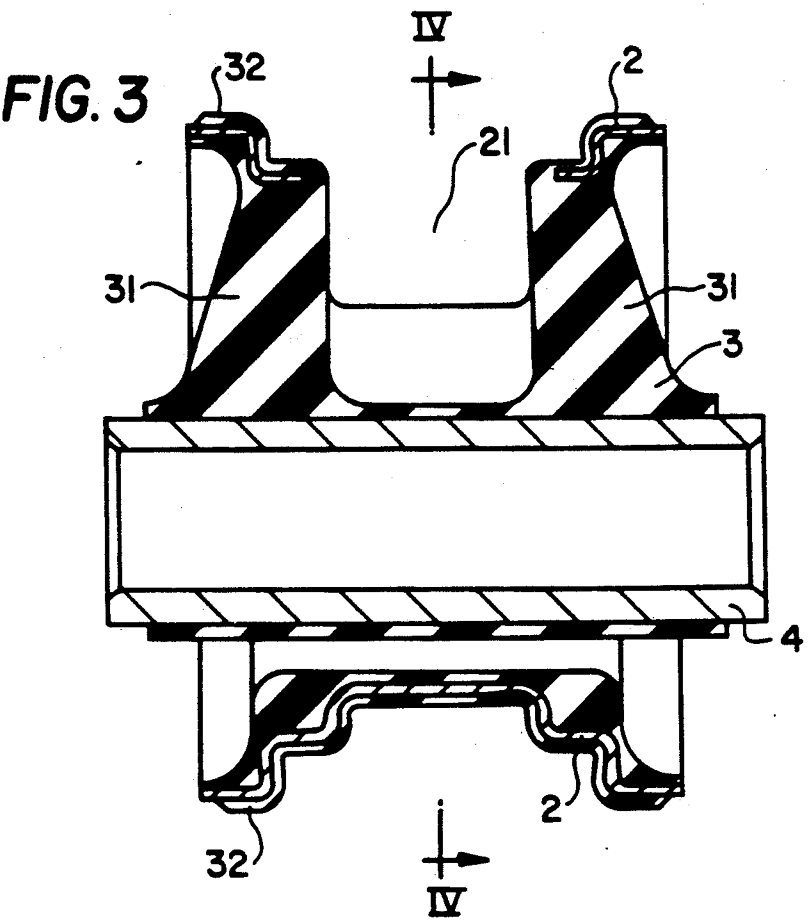
FIG. 3 is a longitudinal sectional view of an inter ring with which a vibration-damping rubber block is formed integrally, and which is used in the method of the first embodiment of the method in accordance with the present invention.

The axially central portion of the internal ring 2 is caved inwardly, and an opening 21 (FIG. 3) is opened in an upper half thereof. The rubber block 3 has wall portions 31, each having a trapezoidal cross-section. The wall portions 31 extend radially upward from respective ends of the main portion of the rubber block 3 in axially spaced relation. An outer peripheral surface of each wall portion 31 takes an arc-shaped configuration, and is joined to an inner periphery of the internal ring 2 around the opening 21.

A seal rubber layer 32 which is continuous with the wall portions 31 extends outside of the internal ring 2.

By press-fitting the internal ring 2 into the outer cylinder 1, an enclosed chamber acting as a main liquid chamber A is defined between the wall portions 31.

Between the outer cylinder 1 and the inwardly caved central portion of the internal ring 2, a throttling member 5 having an arc-shaped configuration is disposed. The throttling member 5 has parallel channels 51, 52. An end of the channel 51 opens into the main liquid chamber A while an end of the channel 52 opens into an auxiliary liquid chamber B described later. The channel 51 communicates with the channel 52 at its middle.

Between the lower half of the inwardly caved central portion of the internal ring 2 and the outer cylinder 1, a thin diaphragm 7 is disposed with a peripheral edge thereof in close contact with an end edge of the throttling member 5, whereby the auxiliary liquid chamber B is defined between the internal ring 2 and the thin diaphragm 7.

Within the main liquid chamber A, a stopper rubber block 6 is disposed, and under the vibration-damping rubber block 3, a cushion rubber body 8 is disposed integrally therewith.

Figure 4:
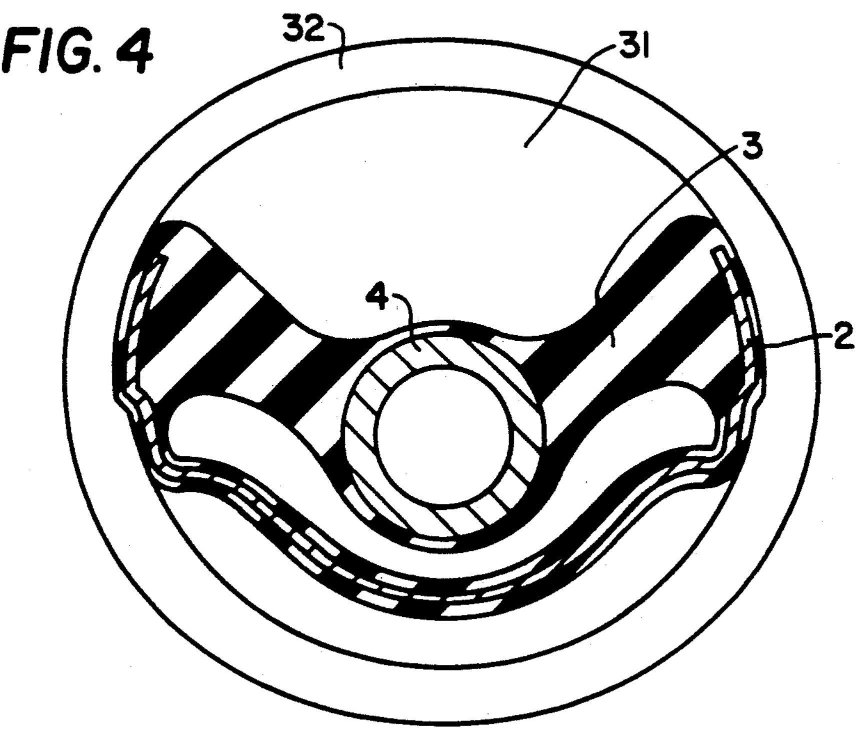
FIG. 4 is a cross-sectional view taken along the line IV—IV of FIG. 3.

With the first embodiment of the method of the present invention, the internal ring having an elliptical cross-section, as shown in FIG. 4, is prepared. Then, the vibration-damping rubber block 3 is integrally formed with the internal ring 2 so that the wall portions 31 extend along a minor axis thereof.

Next, the internal ring 2 having an elliptical cross-section is deformed into a circular cross-section. Due to the deformation of the internal ring 2, the main portion of the rubber block 3, which has extended along the major axis of the internal ring 2, is compressed. This causes the tensile stress which has been generated within the main portion to be converted into the proper compressive stress. In contrast, the wall portions 31, which have extended along the minor axis of the internal ring 2 are pulled outwardly, thereby generating tensile stress therewithin.

The thus obtained internal ring 2 of which the cross-section is changed from an ellipse to a circle is press-fitted into the outer cylinder 1. Then, the outer cylinder 1 is fitted into a circular holder of an engine of a vehicle, and into the inner cylinder 4, a fixed bolt of a body of the vehicle is inserted, for example.

Upon application of the static load of the engine, the axial center of the inner cylinder 4 displaces upwardly from the point X to the point Y in FIG. 2 to compress the wall portions 31, whereby the tensile stress within the wall portions 31 is cancelled.

Therefore, good durability of both the main portion and the wall portions 31 of the vibration-damping rubber block 3 is maintained because the compressive stress if generated within the main portion, and the tensile stress within the wall portions 31 is cancelled at its vibration-neutral point.

Furthermore, with the first embodiment, the producing process can be shortened because the seal rubber layer 32 is formed integrally with the rubber block 3.

The second embodiment of the present invention will be explained with reference to FIGS. 5 and 8.

In order to operate the vibration-damping bushing with excellent damping characteristics, the damping liquid is required to smoothly flow into the auxiliary liquid chamber. To fulfil this requirement, the thin diaphragm defining the auxiliary liquid chamber must be able to freely deform.

In the first embodiment, the diaphragm 7 is prepared separately from the rubber block 3, and then is assembled into the bushing so as to freely deform. Accordingly, this method takes significant time and labor.

With the second embodiment, the above-described problem of the first embodiment is improved.

Figure 5:
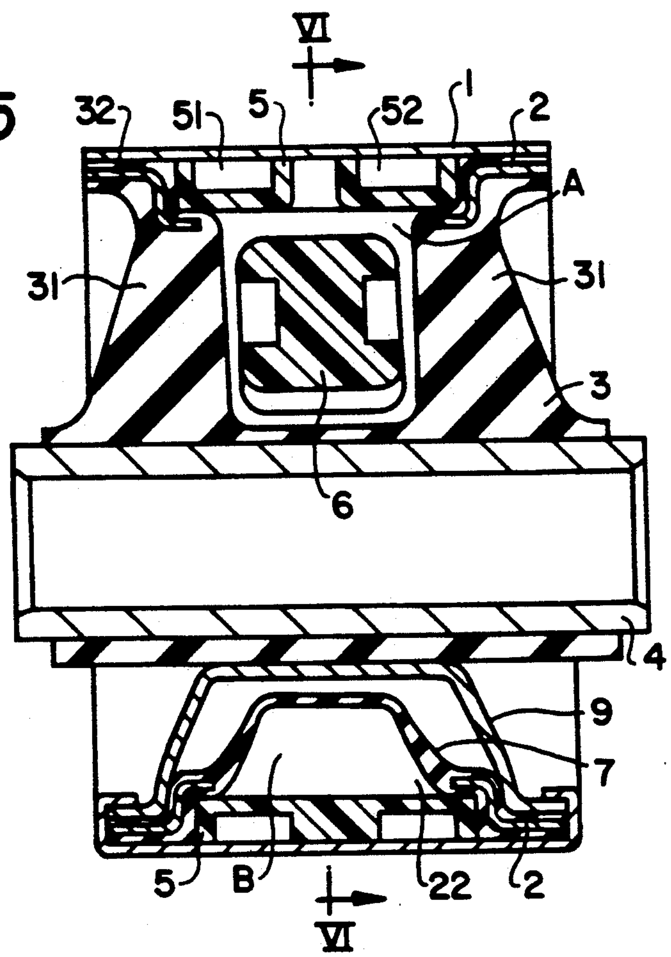
FIG. 5 is a longitudinal sectional view of a cylindrical bushing with hydraulic damping, which is produced by a second embodiment of the method in accordance with the present invention.
Figure 6:
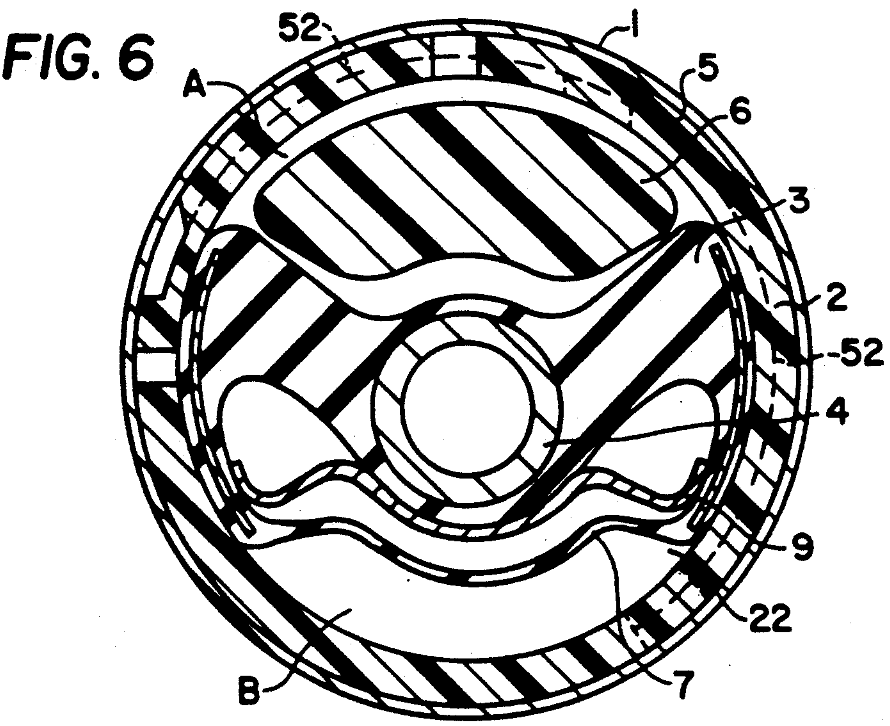
FIG. 6 is a cross-sectional view taken along the line VI—VI of FIG. 5.

FIGS. 5 and 6 illustrate a cylindrical vibration-damping bushing with hydraulic damping, which is produced by the second embodiment of the method in accordance with the present invention.

The lower half of the inwardly caved central portion of the internal ring 2 has an opening 22. Between the lower surface of the rubber block 3 and the outer cylinder 1, the thin diaphragm 7 is disposed with a peripheral edge thereof joined to the peripheral edge of the internal ring 2. The thin diaphragm 7 is continuous with the vibration-damping rubber block 3 formed along the internal ring 2.

A cylindrical throttling member 5 having parallel channels 51, 52 is disposed between the outer cylinder 1 and the inwardly caved central portion of the internal ring 2. One end of the channel 52 opens into the auxiliary liquid chamber B formed between the thin diaphragm 7 and the outer cylinder 1.

Within the space defined by the thin diaphragm 7 and a lower surface of the rubber block 3, a cover plate 9 is provided so as to be integral with the lower surface of the rubber block 3.

The remainder of the structure of the cylindrical bushing produced by the method of the second embodiment is substantially identical to that of the bushing produced by the method of the first embodiment.

Figure 7:
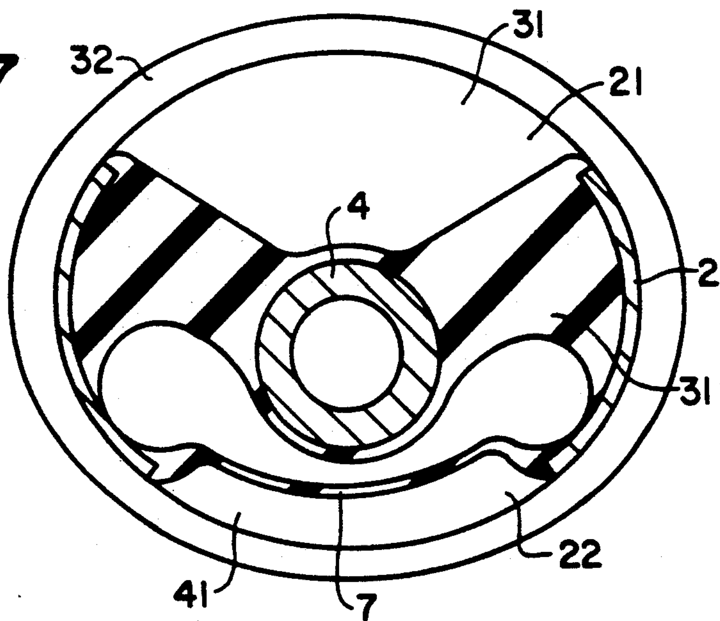
FIG. 7 is a cross-sectional view of an internal ring with which a vibration-damping rubber block is integrally formed and which is used in a second embodiment of the method in accordance with the present invention.

With the second embodiment, the internal ring 2 having an elliptical cross-section, as shown in FIG. 7, and having an opening 22 in its lower surface is prepared. Then, the vibration-damping rubber block 3 and the thin diaphragm 7 are integrally formed along the major axis of the internal ring 2 by injection molding so that the peripheral edge of the thin diaphragm 7 is joined to the peripheral edge of the internal ring 2.

Figure 8:
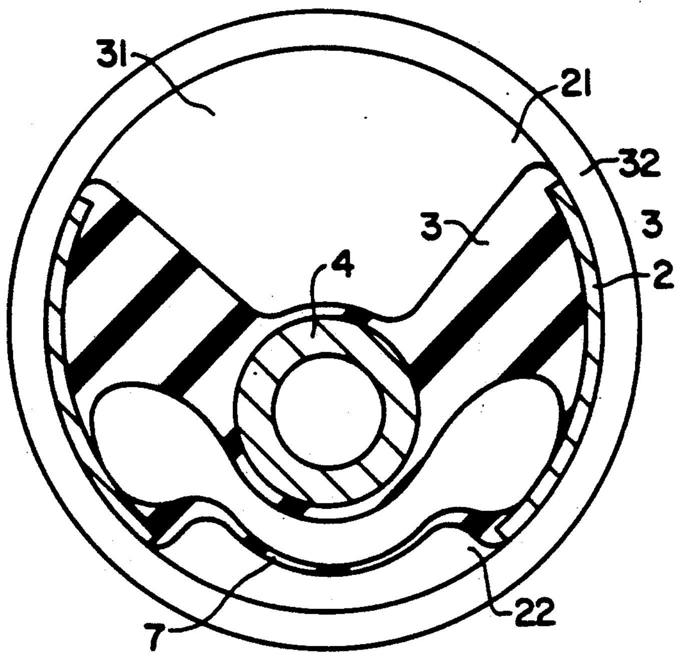
FIG. 8 is a cross-sectional view illustrating the state where the internal ring shown in FIG. 7 is deformed so as to have a circular cross-section.

After the inner cylinder 4 is coaxially embedded in the rubber block 3 so as to penetrate it, the internal ring 2 is deformed to have a circular cross-section (FIG. 8). Then, the deformed internal ring 2 is press-fitted into the outer cylinder 1 with the throttling member 5 disposed around the internal ring 2. Upon press-fitting, the major axis of the internal ring 2 is shortened, and accordingly the thin diaphragm 7 becomes untensioned so as to freely deform.

When vibrations are input to the inner cylinder 4 of the thus obtained bushing, the inner cylinder 4 displaces with respect to the outer cylinder 1 to vary the volume of the main liquid chamber A. This causes the damping liquid to flow into the auxiliary liquid chamber B by way of a passageway of the throttling member 5. At this time, the damping liquid smoothly flows into the auxiliary liquid chamber B because the thin diaphragm 7 defining the auxiliary liquid chamber B can freely deform, as described above.

Accordingly, the cylindrical bushing produced by the method of the second embodiment achieves better vibration-damping performance as compared with the first embodiment.

Furthermore, the durability of the thin diaphragm 7 is greatly improved because no excessively large tensile stress is applied thereto. Moreover, the method of the second embodiment takes less time and labor to assemble the diaphragm to the bushing because it is formed integrally with the rubber block 3.

As described above, with the method of the present invention, the durability of the rubber block, particularly the wall portions, can be improved, and a secure seal can be realized while shortening the production process.

What is claimed is:

1. A method for producing a cylindrical bushing with hydraulic damping, comprising the steps of:

preparing an internal ring having an elliptical cross-section including a major axis and a minor axis;

disposing within said internal ring a vibration-damping rubber block through which an inner cylinder coaxially penetrates and which has wall portions for defining a liquid chamber, so that said wall portions extend along said minor axis of said internal ring;

deforming said internal ring so as to have a circular cross-section; and press-fitting the deformed internal ring into an outer cylinder.

2. A method for producing a cylindrical bushing with hydraulic damping, which has an outer cylinder, a cylindrical internal ring press-fitted into said outer cylinder, a vibration-damping rubber block disposed within said internal ring, and an inner cylinder coaxially embedded in said rubber block, said rubber block having a main portion which horizontally extends and is joined to an inner periphery of said internal ring at horizontally opposed peripheral surfaces thereof, and wall portions which radially upwardly extend from both axial ends of said main portion and are joined to said inner periphery of said internal ring at peripheral surfaces thereof, an axially central portion of said internal ring being inwardly caved, a throttling member having a throttle passageway being disposed between said inwardly caved central portion of said internal ring and said outer cylinder, a thin diaphragm being disposed between a lower surface of said rubber block and said outer cylinder to define an auxiliary liquid chamber, and said auxiliary liquid chamber communicating with said main liquid chamber by way of said throttle passageway, comprising the steps of:

preparing an internal ring having an elliptical cross-section including a major axis and a minor axis;

disposing said vibration-damping rubber block within said internal ring so that said main portion extends along said major axis thereof and said wall portions extend along said minor axis thereof;

deforming said internal ring so as to have a circular cross-section; and press-fitting said deformed internal ring into said outer cylinder with said throttling member interposed between said inwardly caved central portion of said internal ring and said outer cylinder, and said thin diaphragm disposed between said lower surface of said rubber block and said outer cylinder.

3. The method according to claim 2, wherein said internal ring having an elliptical cross-section is formed so as to have an opening in its lower portion which is substantially parallel with said major axis of said elliptical internal ring, said thin diaphragm is integrally formed with said vibration-damping rubber block so as to close said opening of said internal ring having an elliptical cross-section.

4. The method according to claim 2, wherein a rubber seal layer is formed along an outer surface of said internal ring having an elliptical cross-section integrally with said vibration-damping rubber block.

* * * * *